United States Patent
Lee et al.

(10) Patent No.: US 10,944,666 B2
(45) Date of Patent: Mar. 9, 2021

(54) METHOD AND APPARATUS FOR PROVIDING 5G ETHERNET SERVICE

(71) Applicant: Samsung Electronics Co., Ltd., Suwon-si (KR)

(72) Inventors: Jicheol Lee, Suwon-si (KR); Sangjun Moon, Suwon-si (KR); Youngkyo Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 45 days.

(21) Appl. No.: 16/536,650

(22) Filed: Aug. 9, 2019

(65) Prior Publication Data

US 2020/0052999 A1    Feb. 13, 2020

(30) Foreign Application Priority Data

Aug. 13, 2018   (KR) .................. 10-2018-0094631

(51) Int. Cl.
*H04L 12/751*    (2013.01)
*H04L 12/24*     (2006.01)
(Continued)

(52) U.S. Cl.
CPC ............ *H04L 45/026* (2013.01); *H04L 41/08* (2013.01); *H04L 49/25* (2013.01); *H04L 61/6022* (2013.01)

(58) Field of Classification Search
CPC ....... H04L 45/026; H04L 41/08; H04L 49/25; H04L 61/6022; H04L 41/0816; H04L 41/0806; H04L 41/12; H04L 43/10
See application file for complete search history.

(56) References Cited

U.S. PATENT DOCUMENTS 10,064,227 B2    8/2018  Choi et al.
2006/0280131 A1*  12/2006  Rahman ................ H04W 40/24
                                                370/256

FOREIGN PATENT DOCUMENTS

WO    2016/190639 A1    12/2016

OTHER PUBLICATIONS

3GPP; TSG SA; Feasibility study on LAN support in 5G; (Release 16), 3GPP TR 22.821 VI6.1.0, Jun. 23, 2018. (Year: 2018).*
(Continued)

*Primary Examiner* — Shailendra Kumar
(74) *Attorney, Agent, or Firm* — Jefferson IP Law, LLP

(57) ABSTRACT

A communication method and a system for converging a $5^{th}$ Generation (5G) communication system for supporting higher data rates beyond a $4^{th}$-Generation (4G) system with a technology for Internet of Things (IoT) are provided. The disclosure may be applied to intelligent services based on the 5G communication technology and the IoT-related technology, such as smart home, smart building, smart city, smart car, connected car, health care, digital education, smart retail, security and safety services. The disclosure relates to a method for a terminal, the method including transmitting a protocol data unit (PDU) setup request message including information indicating support of a switch mode, receiving switch mode configuration information associated with the switch mode, and performing a switch mode operation based on the switch mode configuration information, wherein the switch mode configuration information includes information indicating whether to execute a spanning tree algorithm.

20 Claims, 10 Drawing Sheets

Case A) UE Indicates that UE Port's State ChangeCl

Case B) UE Indicates that UE Port's State Change

(51) Int. Cl.
*H04L 12/947* (2013.01)
*H04L 29/12* (2006.01)

(56) References Cited

OTHER PUBLICATIONS

Intel, 'Key issues for 5G-LAN service discovery, selection and restriction', 3GPP TSG SA WG2 Meeting #128, Vilnius, Lithuania, Jun. 26, 2018, S2-186851. (Year: 2018).*
Intel, 'Key issues of Service and Session Management for 5G-LAN type Service', 3GPP TSG SA WG2 Meeting #128, Vilnius, Lithuania, Jun. 26, 2018, S2-186854. (Year: 2018).*
Nokia, Nokia Shanghai Bell, "Controlled support of (AF) session binding for Ethernet PDU Session Type", SA WG2 Meeting #126, Feb. 26-Mar. 2, 2018, Montreal, Canada, S2-181678 (Year: 2018).*
"3GPP; TSG SA; Feasibility study on LAN support in 5G; (Release 16)", 3GPP TR 22.821 V16.1.0, Jun. 23, 2018 See pp. 28-30.
Intel, "Key issues for 5G-LAN service discovery, selection and restriction", S2-186851, 3GPP TSG SA WG2 Meeting #128, Vilnius, Lithuania, Jun. 26, 2018 See pp. 1-3.
Intel, "Key issues of service and session management for 5G-LAN type service", S2-186854, 3GPP TSG SA WG2 Meeting #128, Vilnius, Lithuania, Jun. 26, 2018 See pp. 1-4.
Nokia et al., "Controlled support of (AF) session binding for Ethernet PDU session type", S2-181678, 3GPP TSG SA WG2 Meeting #126, Montreal, Canada, Feb. 20, 2018 See pp. 1-4.
International Search Report dated Nov. 18, 2019, issued in International Patent Application No. PCT/KR2019-010098.

* cited by examiner

FIG. 3B

| Port Role | Port State | Legend |
|---|---|---|
| Designated | Discarding<br>Learning<br>Forwarding | ●╫────<br>●┼────<br>●─────  |
| & operEdge | Forwarding | ●◇──── |
| Root Port<br>Or<br>Master Port | Discarding<br>Learning<br>Forwarding | ○╫────<br>○┼────<br>○───── |
| Alternate | Discarding<br>Learning<br>Forwarding | ─╫────<br>─┼────<br>────── |
| Backup | Discarding<br>Learning<br>Forwarding | ─╫╫───<br>>┼────<br>>───── |
| Disabled | | ─/──── |
| Transmitted Bpdus | | |
| Designated<br>Designated Proposal<br><br>Root<br>Root Agreement | | ────▶<br>───▶▶<br><br>────▷<br>───▷▷ |

Proposed Architecture (Switch, Device Model)

METHOD AND APPARATUS FOR PROVIDING 5G ETHERNET SERVICE

CROSS-REFERENCE TO RELATED APPLICATION(S)

This application is based on and claims priority under 35 U.S.C. § 119(a) of a Korean patent application number 10-2018-0094631, filed on Aug. 13, 2018, in the Korean Intellectual Property Office, the disclosure of which is incorporated by reference herein in its entirety.

BACKGROUND

1. Field

The disclosure relates to an Ethernet service for supporting a $5^{th}$ Generation (5G) local area network (LAN).

2. Description of Related Art

To meet the demand for wireless data traffic having increased since deployment of $4^{th}$-Generation (4G) communication systems, efforts have been made to develop an improved 5G or pre-5G communication system. Therefore, the 5G or pre-5G communication system is also called a 'Beyond 4G Network' or a 'Post Long Term Evolution (LTE) System'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid Frequency Shift Keying (FSK) and Quadrature Amplitude Modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, MTC, and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, in 3GPP that is in charge of cellular mobile communication standards, a new core network structure is called a 5G Core (5GC), and the standardization thereof is underway with the goal of moving from the existing 4G LTE system to a 5G system.

In comparison with an evolved packet core (EPC), which is a network core of existing 4G, the 5GC supports differentiating functions as follows.

First, in 5GC, a network slicing function is introduced. As the 5G requirements, 5GC must support various types of terminals and services. For example, the services may include enhanced mobile broadband (eMBB), ultra-reliable low-latency communications (URLLC), and massive machine-type communications (mMTC). The respective terminals or services have different requirements depending on the core network. For example, the eMBB service requires a high data rate and a URLLC service requires high stability and low latency. A technology proposed to satisfy these various service requirements is a network slicing scheme. Network slicing is a method for configuring several logical networks through virtualization of one physical network, and respective network slice instances (NSIs) may have different characteristics. This becomes possible since the respective NSIs have network functions (NF) matching the respective characteristics thereof. Various 5G services can be efficiently supported by allocating NSIs matching the characteristics of the services demanded for the respective terminals.

Second, 5GC can easily support a network virtualization paradigm by separating a mobility management function and a session management function from each other. In the existing 4G LTE, all terminals may be provided with services in a network through signaling exchange with single-core equipment called a mobility management entity (MIME), which is in charge of registration, authentication, mobility management and session management functions. However, in 5G, since the number of terminals has explosively increased and the mobility and traffic/session characteristics that must be supported according to terminal types are sub-divided. As a result, if a single apparatus, such as the MME, supports all the functions, the apparatus will have degraded scalability by adding an entity for each required function. Accordingly, in order to improve scalability in view of the function/implementation complexity of the core equipment that is in charge of a control plane and signaling load, various functions have been developed based on a structure for separating the mobility management function and the session management function from each other.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for providing an Ethernet service for supporting a 5$^{th}$ Generation (5G) local area network (LAN).

Another aspect of the disclosure is to provide a method in which when an Ethernet protocol data unit (PDU) session is generated, a session management function (SMF) determines terminal/switch configuration information for a terminal supporting a switch mode and transfers the determined configuration information to the terminal, and the terminal configures a terminal/switch according to the configuration information transferred by the SMF, and an apparatus for performing the method.

Another aspect of the disclosure is to provide a method in which a terminal supporting a switch mode collects medium access control (MAC) addresses of Ethernet devices connected to a switch subnetwork, and transfers the collected MAC addresses to a network, and the network changes a forwarding table of a user plane function (UPF) through MAC address information reported by the terminal, and manages a proxy address resolution protocol (ARP) table, so as to transfer a broadcast message to a required terminal, and an apparatus for performing the method.

Another aspect of the disclosure is to provide a method in which a terminal supporting a switch mode performs a spanning tree algorithm according to information configured by a network, and after the spanning tree algorithm is performed, transfers, to a network, port state information for an uplink port oriented toward the UPF and an apparatus for performing the method.

Additional aspects will be set forth in part in the description which follows and, in part, will be apparent from the description, or may be learned by practice of the presented embodiments.

In accordance with another aspect of the disclosure, a method for a terminal is provided. The method includes transmitting a PDU setup request message including information indicating whether the terminal supports a switch mode, receiving switch mode configuration information associated with the switch mode, and performing a switch mode operation based on the switch mode configuration information, wherein the switch mode configuration information includes information indicating whether to execute a spanning tree algorithm.

In accordance with another aspect of the disclosure, a terminal is provided. The terminal includes a transceiver, and a processor coupled with the transceiver and configured to transmit a PDU setup request message including information indicating whether the terminal supports a switch mode, receive switch mode configuration information associated with the switch mode, and perform a switch mode operation based on the switch mode configuration information, wherein the switch mode configuration information includes information indicating whether to execute a spanning tree algorithm.

In accordance with another aspect of the disclosure, a method for a SMF is provided. The method includes receiving information indicating a terminal to support a switch mode, generating switch mode configuration information which is associated with the switch mode and includes information indicating whether to execute a spanning tree algorithm, and transmitting the switch mode configuration information associated with the switch mode, wherein a switch operation of the terminal is performed based on the switch mode configuration information.

In accordance with another aspect of the disclosure, a SMF is provided. The SMF includes a transceiver, and a processor coupled with the transceiver and configured to receive information indicating a terminal to support a switch mode, generate switch mode configuration information which is associated with the switch mode and includes information indicating whether to execute a spanning tree algorithm, and transmit the switch mode configuration information associated with the switch mode, wherein a switch mode operation of the terminal is performed based on the switch mode configuration information.

According to an embodiment of the disclosure, in the case of supporting an Ethernet PDU session, a spanning tree algorithm is performed when a dynamic network topology change occurs, so as to prevent a broadcast flood (or broadcast storm).

According to an embodiment of the disclosure, when a terminal supporting an Ethernet PDU session operates in a switch mode, a network notifies a terminal of configuration information, and the terminal may change a period in which a spanning tree algorithm is performed according to the configuration information received from the network so as to prevent a broadcast storm.

According to an embodiment of the disclosure, a terminal supporting a switch mode collects MAC addresses of Ethernet devices connected to a subnetwork and notifies a network of the collected MAC addresses, so that the network may implement a proxy ARP function to prevent a broadcast storm.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 3A and 3B illustrate unnecessary broadcast transmissions according to an embodiment of the disclosure;

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, description of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description of embodiments of the disclosure, a base station is a subject which allocates resources to a terminal, and may be at least one of a Node B, an evolved Node B (eNode B or eNB), a base station (BS), a radio access network (RAN), an access network (AN), a RAN node, a wireless access unit, a BS controller, a next generation Node B (gNB), or a node on a network. The terminal may include a user equipment (UE), a mobile station (MS), a terminal, a cellular phone, a smartphone, a computer, or a multimedia system capable of performing a communication function.

In the embodiments of the disclosure, an Ethernet device may be interchangeably used with a device.

Hereinafter, a downlink (DL) in embodiments of the disclosure indicates a wireless transmission path of a signal that a base station transmits to a terminal. An uplink (UL) indicates a wireless transmission path of a signal that a terminal transmits to a base station. In the following description, the embodiments of the disclosure will be described by way of a long term evolution (LTE) or LTE-advanced (LTE-A) system, but the embodiments of the disclosure may be applied to other communication systems having similar technical backgrounds and channel types. Further, the embodiments of the disclosure may be applied to other communication systems through some modifications and changes determined and made by those skilled in the art without significantly departing from the scope of the disclosure.

Figure 1:
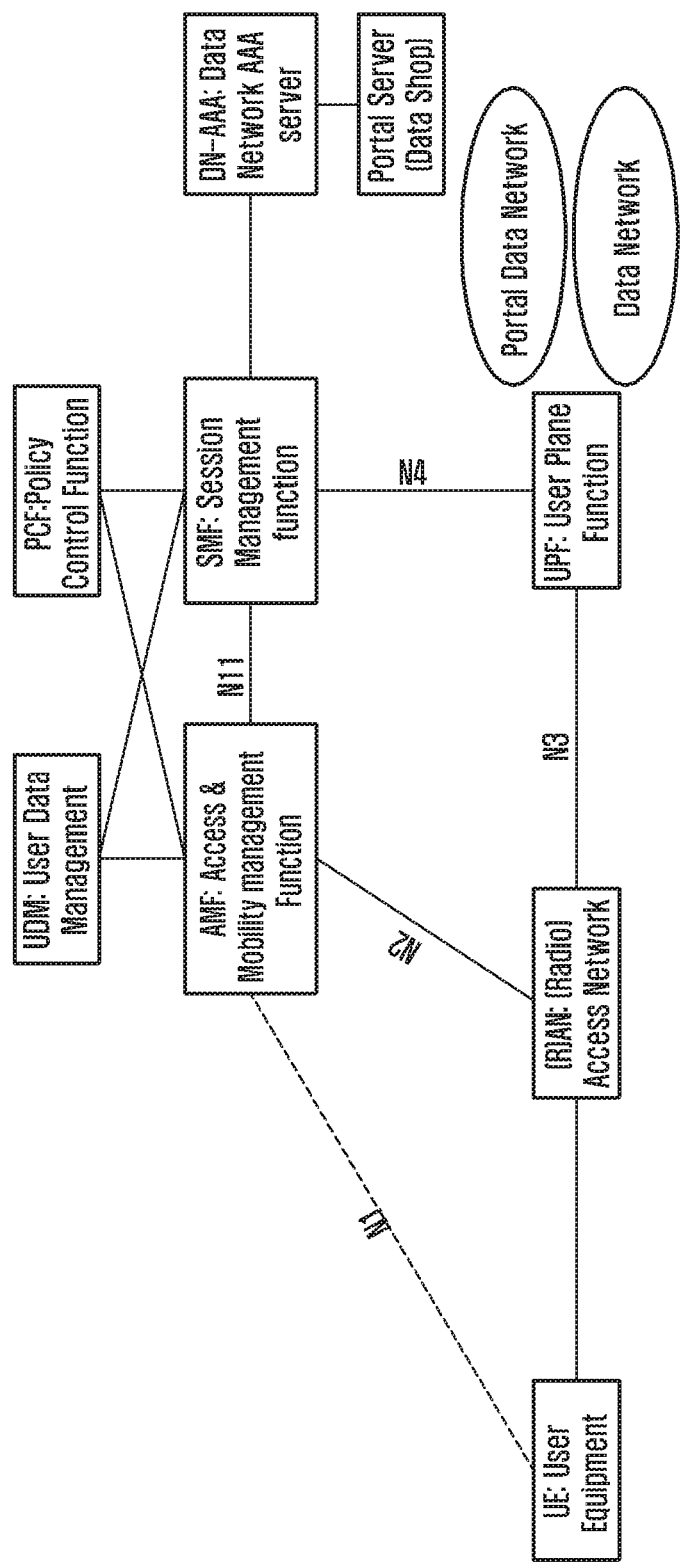
FIG. 1 is a network configuration diagram according to an embodiment of the disclosure.

FIG. 1 is a diagram illustrating a network architecture for a 5$^{th}$ Generation (5G) system according to an embodiment of the disclosure.

Referring to FIG. 1, in a network architecture for a 5G system, an access and mobility management function (AMF) for managing the mobility of a terminal and network registration and a session management function (SMF) for managing an end-to-end session may be separated from each other, and the AMF and the SMF may exchange signaling through an N11 interface.

For a connection of a terminal to a data network, when the data network is an internet protocol (IP) network, the 5G system may allocate an IP address or IP prefix to a terminal through a SMF that manages a session of the terminal in a session connection process.

An embodiment of the disclosure relates to application of a 5G system to a specific space (e.g., a factory) and includes the following scenario. Hereinafter, a factory is described as an example of a specific space, but the embodiment of the disclosure is not limited thereto. In a factory network, existing Ethernet connected networks need to be replaced with a 5G-based wireless network. For example, in the case where a device is moving and a wired cable must be connected through a dangerous area, if devices requiring connectivity are moving, it may be necessary to replace the existing Ethernet connected network with a wireless network.

In addition, in the case where quick re-configuration is required due to layout changes of equipment installed at a factory, wireless connections therebetween may contribute to productivity improvement.

Such a 5G local area network (LAN) service may augment the existing wireless LAN (WLAN) or LAN installed at a factory, or may completely replace the existing wired LAN and wireless LAN.

Such a network installation scenario should be supported without modification by a 5G LAN communication system in which existing controllers, switch sensors, and actuators are newly improved, and the 5G LAN system replacing the existing transmission system should meet the services and capabilities required for the existing end device (endpoint device) to be operated in a wired system.

In addition, the Ethernet connected network should support a spanning tree protocol (STP), and the spanning tree algorithm in a wired network operates as described in FIG. 2 below.

Figure 2:
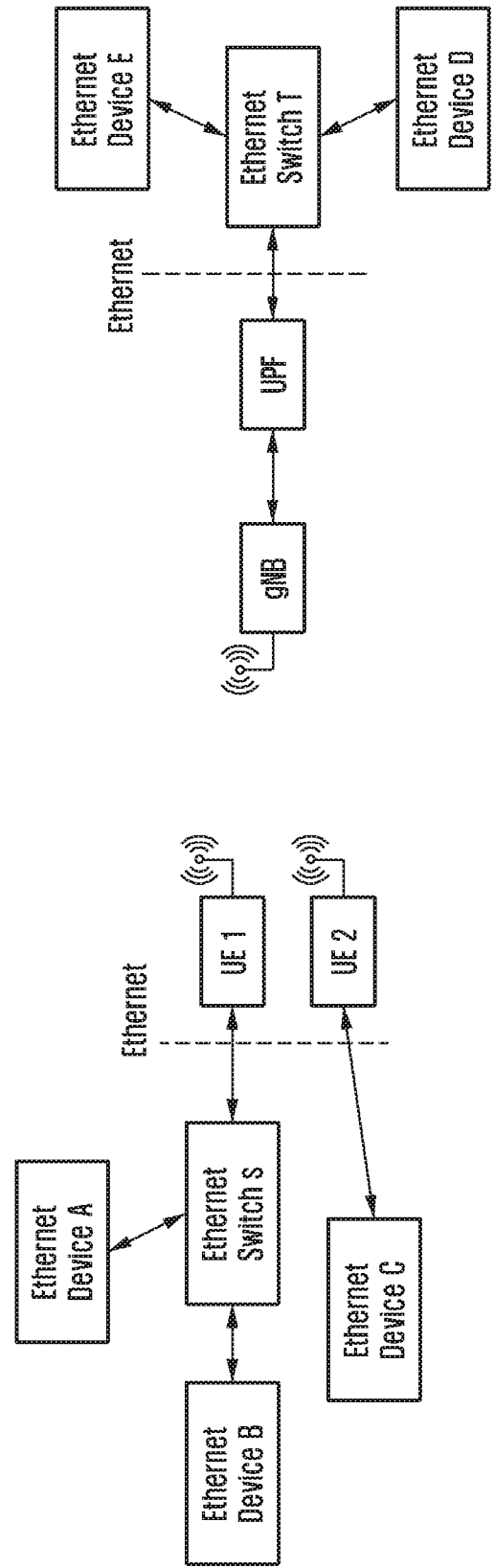
FIG. 2 is a configuration diagram of an Ethernet service according to an embodiment of the disclosure.

FIG. 2 illustrates a configuration diagram of an Ethernet service according to an embodiment of the disclosure.

Referring to FIG. 2, device C is connected to switch S, and device C, switch S, and UE 1 and UE 2 configure a loop.

A spanning tree algorithm, such as a rapid STP (RSTP), corresponds to a protocol that allows switches in an Ethernet network to have one path oriented toward another switch. The RSTP is a protocol defined under the 802.1w standard, and is for configuring a loop-free logical topology in the Ethernet network. The base protocol of RSTP is identical to a STP, which prevents loops from occurring between Ethernet bridges and prevents broadcast message flooding (broadcast storms) caused by the loops.

It is possible to prevent the occurrence of loops and flooding of broadcast messages by blocking a specific port in the Ethernet network, and the spanning tree algorithm may block transmission to device C through either UE1 or UE2 based on a path calculation.

The spanning tree algorithm finds the shortest path between a selected root node and a device of interest (in this case, device C) and blocks another path toward the same device. Once a path is selected, other paths are blocked, so that a broadcast frame should not be forwarded through the blocked path.

Again, the broadcast frame should not be forwarded to the blocked UE. In addition, in the 5G system, the routing of the Ethernet frame should be performed as a result of the spanning tree algorithm.

The path in the Ethernet network is discovered by exchanging a packet data unit (PDU) such as a bridge PDU (BPDU), which includes information on ports available for Ethernet switches.

Since Ethernet devices except for switches do not transfer BPDUs, it may be necessary to limit the number of devices connected to the UE to one in order to find a network topology behind the UE (i.e., at a lower hierarchy).

However, if a plurality of Ethernet devices need to be connected to a UE, one switch may be connected to the UE and a plurality of Ethernet devices may be connected to the UE.

In the network configuration shown in FIG. 2, the UE must perform a spanning tree algorithm using an Ethernet frame. A periodic BPDU message should be transmitted in order to perform a spanning tree algorithm between a switch connected behind the UE and a switch connected behind a user plane function (UPF).

Since a transmission period of a BPDU Hello message is configured by default (for example, 2 seconds) in the existing switch, if such a network configuration is used, the BPDU message should be continuously exchanged between switches every 2 seconds.

When the message is exchanged every 2 seconds, in the 5G system, if an inactivity timer in the RAN is longer than the transmission period in which the BPDU Hello message is sent, a terminal is constantly maintained in a connected (e.g., CM-CONNECTED) state, and a moving terminal such as a robot may consume a large amount of a battery charge.

If the inactivity timer in the RAN is shorter than the transmission period in which the BPDU Hello message is sent and the interval is frequent, a terminal repeatedly comes into an idle (e.g., CM-IDLE) state and the connected state, and a large amount of unnecessary signaling traffic is generated in a network, especially between a base station and a core network.

In order to prevent unnecessary consumption of battery resources and network resources, a network switch connected to a terminal may be configured to turn off the operation of a spanning protocol. Changing the configuration of the network switch whenever the network configuration is dynamically changed may introduce several configuration difficulties and result in a flood of the Ethernet network packets that is caused by incorrect configuration by an operator.

If a topology that enables a wireless interval to participate in the Ethernet network due to a plurality of Ethernet connections is configured, unnecessary broadcast messages may be transferred to a terminal.

Figure 3A:
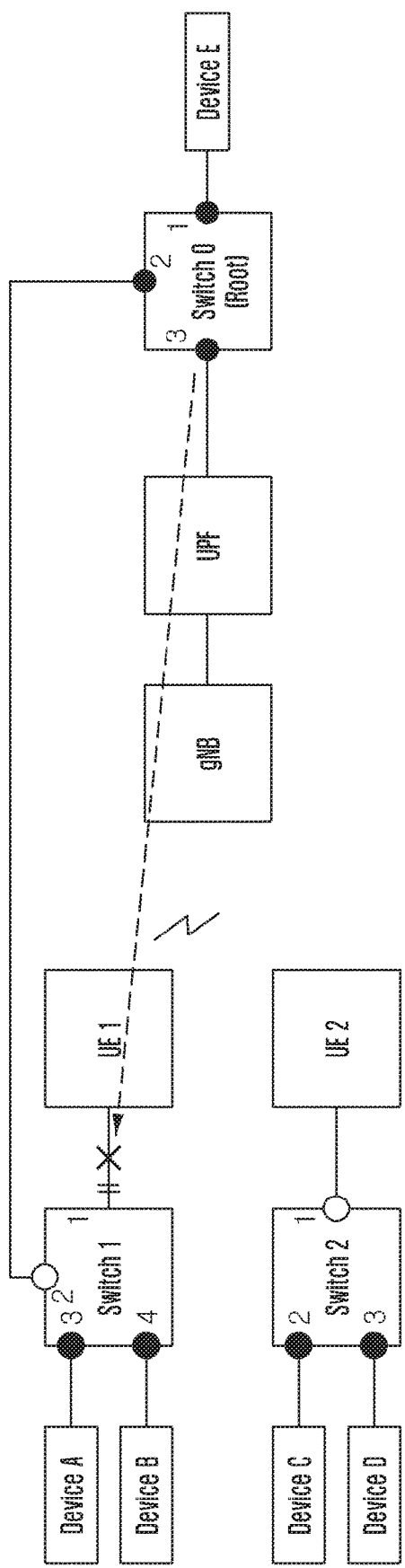
Figure 3A:
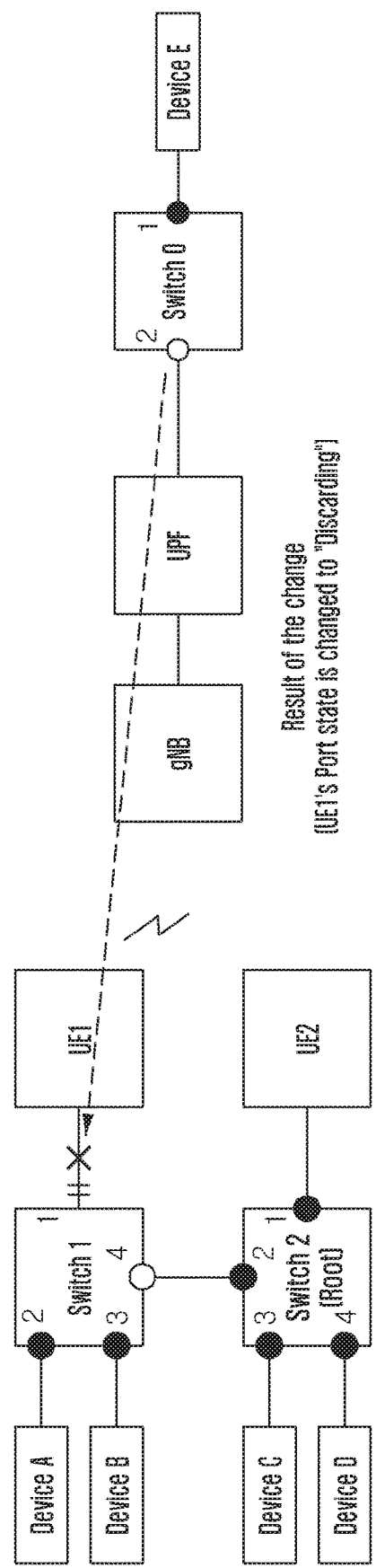

FIGS. 3A and 3B illustrate unnecessary broadcast transmissions according to an embodiment of the disclosure.

Referring to FIGS. 3A and 3B, when a duplicate link occurs due to the dynamic network configuration, UE 1 and a switch connected thereto operate independently of each other, so that an unnecessary broadcast message can be transferred.

Referring to FIGS. 3A and 3B, case A illustrates a wired link that is directly connected from a port 2 of switch 1 to a port 2 of switch 0 according to a dynamic network configuration change. As can be seen from FIGS. 3A and 3B, a port (port 1 of switch 1) through which switch 1 is connected to UE 1 is in a "discarding" state (indicated as "x" in the drawing) by the operation of the RSTP protocol. However, a broadcast message transferred from switch 0 is transferred to all UEs through the UPF, and both UE 1 and UE 2 receive the broadcast message. The UE 1 transmits the received Ethernet broadcast message to switch 1. However, the port of switch 1 is in a "discarding" state and the received packet is discarded by switch 1.

Referring to FIGS. 3A and 3B, case B illustrates that a switch 2 connected to UE 2 is selected as a root switch, and in this situation, switch 1, connected to UE 1, and switch 2, connected to UE 2, are connected to each other. Port 4 of switch 1 functions as a root port, and switch 2 functions as a root switch having only a designated port. In the example of FIGS. 3A and 3B, it is presumed that wired communication costs less than 5G wireless communication, and thus port 4 of switch 1 is selected as the path toward a root port according to the spanning tree algorithm set forth in IEEE 802.1w, so that port 1, through which switch 1 and UE 1 are connected, is in a "discarding" state.

When configuring a logical spanning tree without a loop, if a broadcast message is transmitted from device E, the message is transmitted to the UPF through port 2 of switch 0. The UPF determines that the message is a broadcast message, and then transmits the broadcast message to both UE1 and UE2. The broadcast message, having arrived via UE 1 is discarded at port 1 of switch 1. Thus, unnecessary messages may be transmitted over a wireless channel.

The following embodiments of the disclosure provide an improved method and an apparatus for performing the method.

Figure 4:
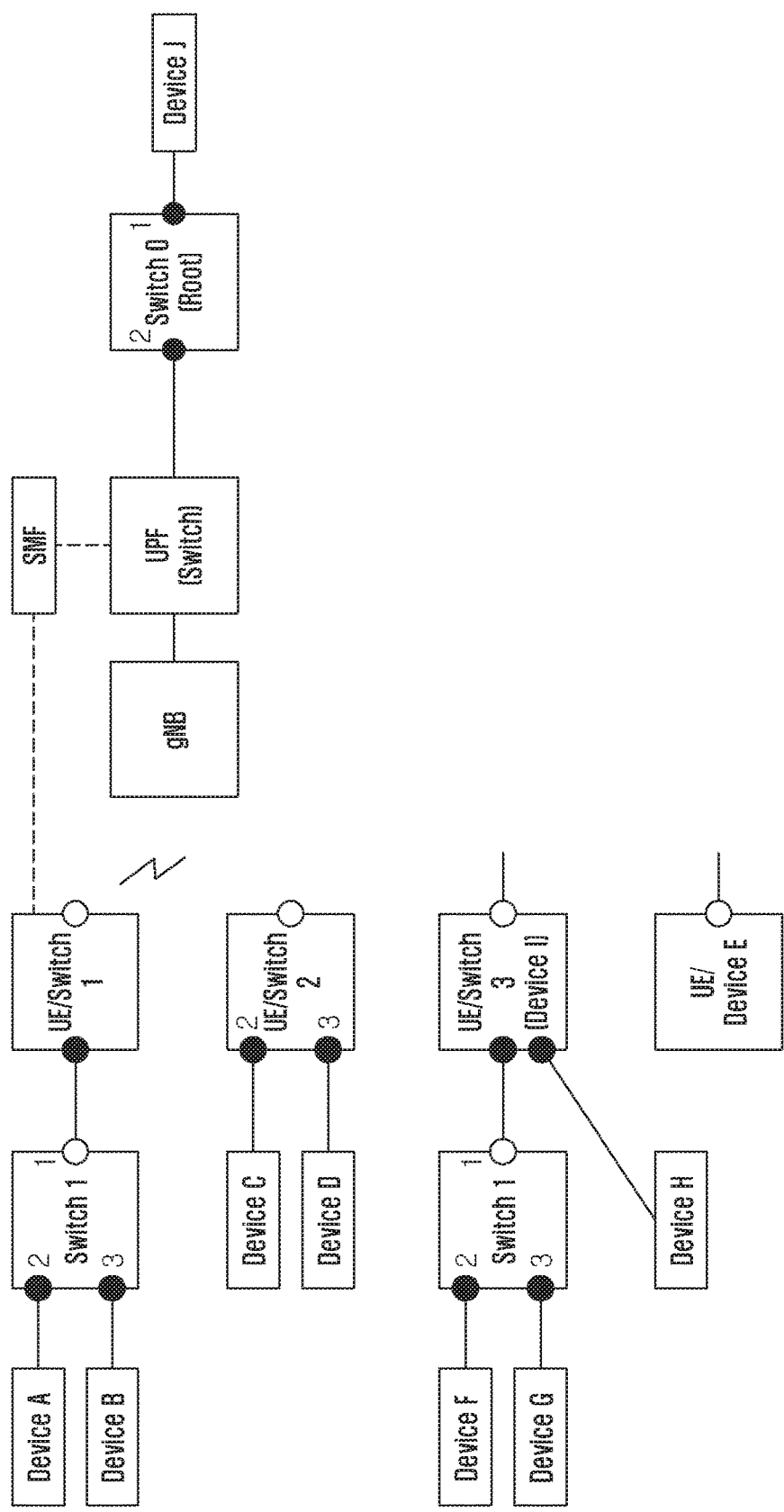
FIG. 4 illustrates an Ethernet service structure in a switch mode according to an embodiment of the disclosure.

FIG. 4 illustrates an Ethernet service structure in a switch mode according to an embodiment of the disclosure.

Referring to FIG. 4, a terminal supports a switch mode for supporting an Ethernet switch function. Likewise, UPF also supports a switch mode. In addition, the UPF in an embodiment of FIG. 4 supports a switch function.

For the convenience of explanation, in the following examples, the first embodiment, the second embodiment, and the third embodiment will be described separately, but it is possible to combine and carry out the respective embodiments in various combinations. For example, it is possible to perform operations of the second embodiment and the third embodiment according to information configured in the PDU session establishment process of the first embodiment.

First Embodiment

A first embodiment of the disclosure relates to configuration of terminal/switch information.

A terminal operating as a terminal/switch generates an Ethernet PDU session in a 5G network through a PDU session generation procedure. The procedure is shown in FIG. 5.

Figure 5:
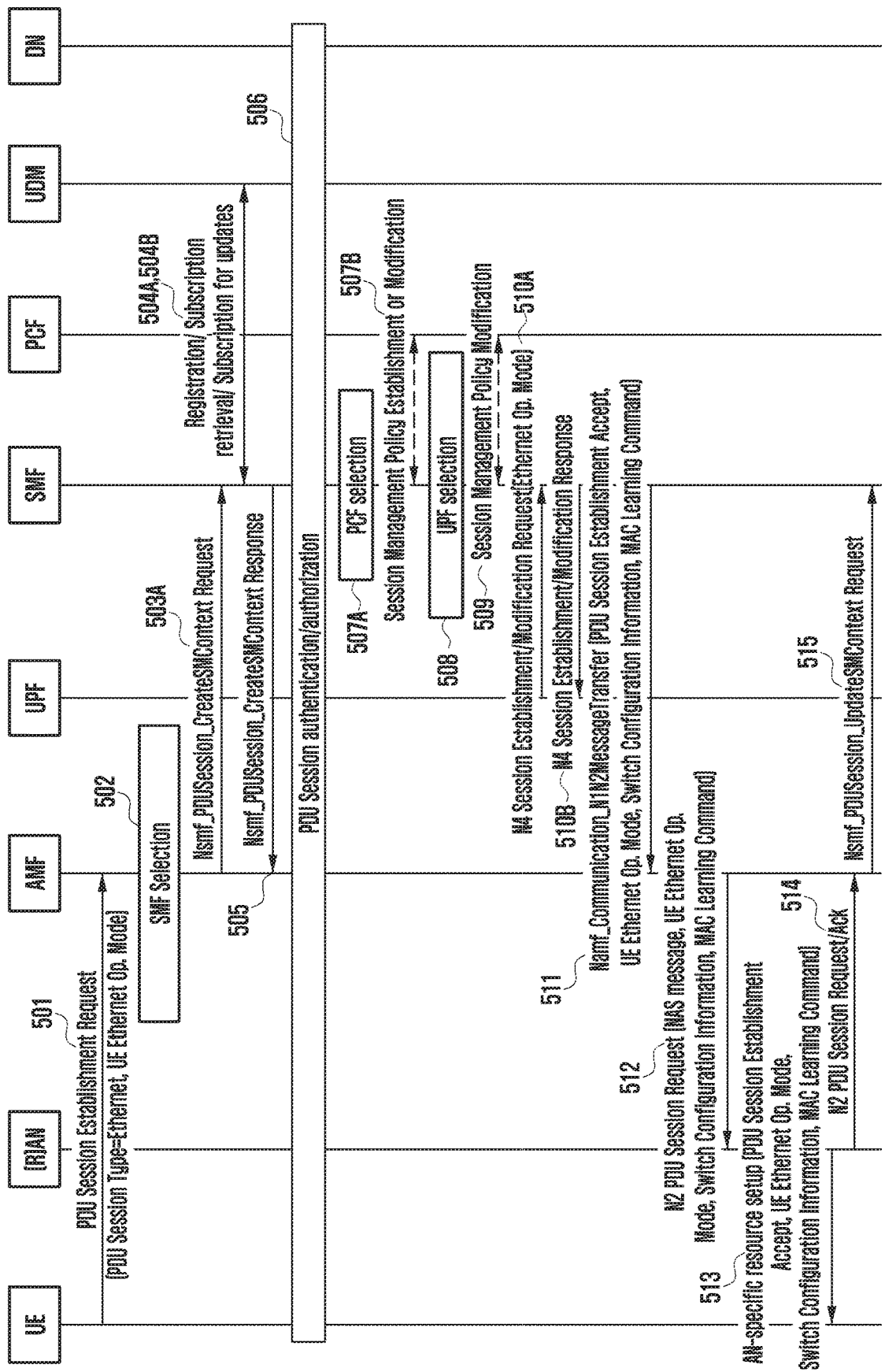
FIG. 5 illustrates an Ethernet packet data unit (PDU) session generation procedure according to an embodiment of the disclosure.

FIG. 5 illustrates an Ethernet PDU session generation procedure according to an embodiment of the disclosure.

Referring to FIG. 5, in operation 501, a terminal may transmit a PDU session establishment request to an AMF. The PDU session establishment request may include information on operation mode (e.g., PDU session type=Ethernet, and UE Ethernet operation (Op) Mode). The UE Ethernet Op mode information may indicate whether the terminal supports a switch mode. In addition, when the UE Ethernet Op Mode information is included in the PDU session establishment request, it may be understood that the terminal supports the switch mode. The switch mode performs the function of a switch in an Ethernet system (i.e., the terminal acts like a switch). In operation 502, the AMF may select an SMF based on the PDU session establishment request. In operation 503A, the AMF may transmit an Nsmf_PDU session_createSMC context request to the SMF. Through operations 504A and 504B, the SMF and user data management (UDM) may perform operations, such as registration, subscriber information search, and subscriber information update. After operation 504B, the SMF may transmit an Nsmf_PDUsession_createSMC Context response to the AMF. In operation 506, network entities may perform authentication and verification processes for the PDU session and generate a PDU session.

In operation 507A, the SMF selects a policy control function (PCF). In operation 507B, the SMF and PCF perform a session management policy establishment or modification operation. In operation 508, the SMF performs an operation of UPF selection. In operation 509, the SMF may perform an operation of session management policy modification. In operation 510A, the SMF may transmit an N4 session establishment/modification request to the UPF, and in operation 510B, the UPF may transmit an N4 session establishment/modification response to the SMF. The N4 session establishment/modification request may include Ethernet Op mode information.

Then, in operation 511, the SMF may transmit information to the UE through the AMF or RAN (or AN). The SMF may transmit Namf_communication_N1N2Message Transfer to the AMF.

In the case in which a terminal in a switch mode generates a PDU session in order to access a network, the SMF may configure, in the switch mode terminal, information as follows, according to a business operator's policy and preconfigured information. The Namf_communication_N1N2Message Transfer may include at least one of PDU session establishment accept, UE Ethernet Op Mode, switch configuration information, and a media access control (MAC) learning command. The Namf_communication_N1N2Message Transfer may also include spanning tree configuration information, network change information, and configuration information.

The spanning tree configuration information (e.g., switch configuration information) may include (1) Information indicating whether to execute a spanning tree algorithm (e.g., RSTP); (2) Information on a BPDU Hello packet transmission period; (3) Information on Hello packet timeout period (i.e., information for determining whether or not the link is disconnected at time-out); and (4) a Bridge identifier or a switch identifier (i.e., information for identifying bridge, switch, master node, etc. in the case of BPDU message transfer).

The network change information may include an indicator to notify a network of whether state information has changed after performing RSTP. That is, when a port state information changes, the indication may indicate whether to provide notification of the change, or indicate to a network whether a port state has changed when changing to a specific port state (i.e., information indicating reporting of a port state information change to a network when the port state information change occurs).

The configuration information (e.g., MAC learning command) may indicate whether MAC address collection is performed and may indicate whether or not notification is performed. The configuration information may indicate whether or not MAC addresses are collected in an active manner or whether or not MAC addresses are collected in a passive manner.

In operation 512, the AMF may transmit, to the RAN or AN, an N2 PDU session request including information which has been received from the SMF in operation 511. In operation 513, the RAN or AN may transmit, to a UE, RAN specific resource setup including information that has been received in operation 512. In operation 514, the RAN or AN may transmit, to the AMF, an N2 PDU session request acknowledgement (ACK) in response to a message received in operation 512. In operation 515, the AMF may transmit, to the SMF, an Nsmf_PDUsession_update SMC context request.

When a PDU session is generated using the above described method, switch configuration information may be configured for a terminal supporting a switch mode, and the terminal may perform a switch operation based on the configured information received from the network. The terminal may or may not execute a spanning tree algorithm according to information indicating whether to execute the spanning tree algorithm. In addition, the terminal may perform an operation of transmitting a BPDU Hello packet according to preconfigured period information. In addition, the terminal may determine whether a link is disconnected based on information on the Hello packet timeout period. In addition, the terminal may perform, based on the configuration information, MAC address collection and reporting operations according to the second embodiment, and when the state of a network direction port of a switch has changed, an operation of notifying a network of the state change according to the third embodiment, which will be described below.

Second Embodiment

A terminal operating in a switch mode determines whether to collect MAC addresses. The terminal determine whether to collect mac addresses: (1) when a PDU session is generated or a MAC address collection request is received from the SMF (for example, in the case in which the same is configured through operation 511 in FIG. 5 (2) when a terminal is selected as a root switch of an Ethernet network at a lower node of a switch; or (3) when a terminal is determined to collect MAC addresses by its own configuration.

When the terminal determines to collect MAC addresses, the terminal activates a MAC address collection algorithm in an active or passive manner to collect MAC addresses of Ethernet devices connected to a lower node of a switch.

An example of an active collection method may be as follows: a method for, if an IP network operates in a corresponding subnet, transmitting a ping message to a broadcast IP address of the corresponding subnet and receiving a response thereto.

An example of a passive collection method may be as follows: a terminal may collect MAC addresses through header information of an Ethernet frame via a switch.

The switch mode terminal notifies a network of a list of collected MAC addresses.

Figure 6:
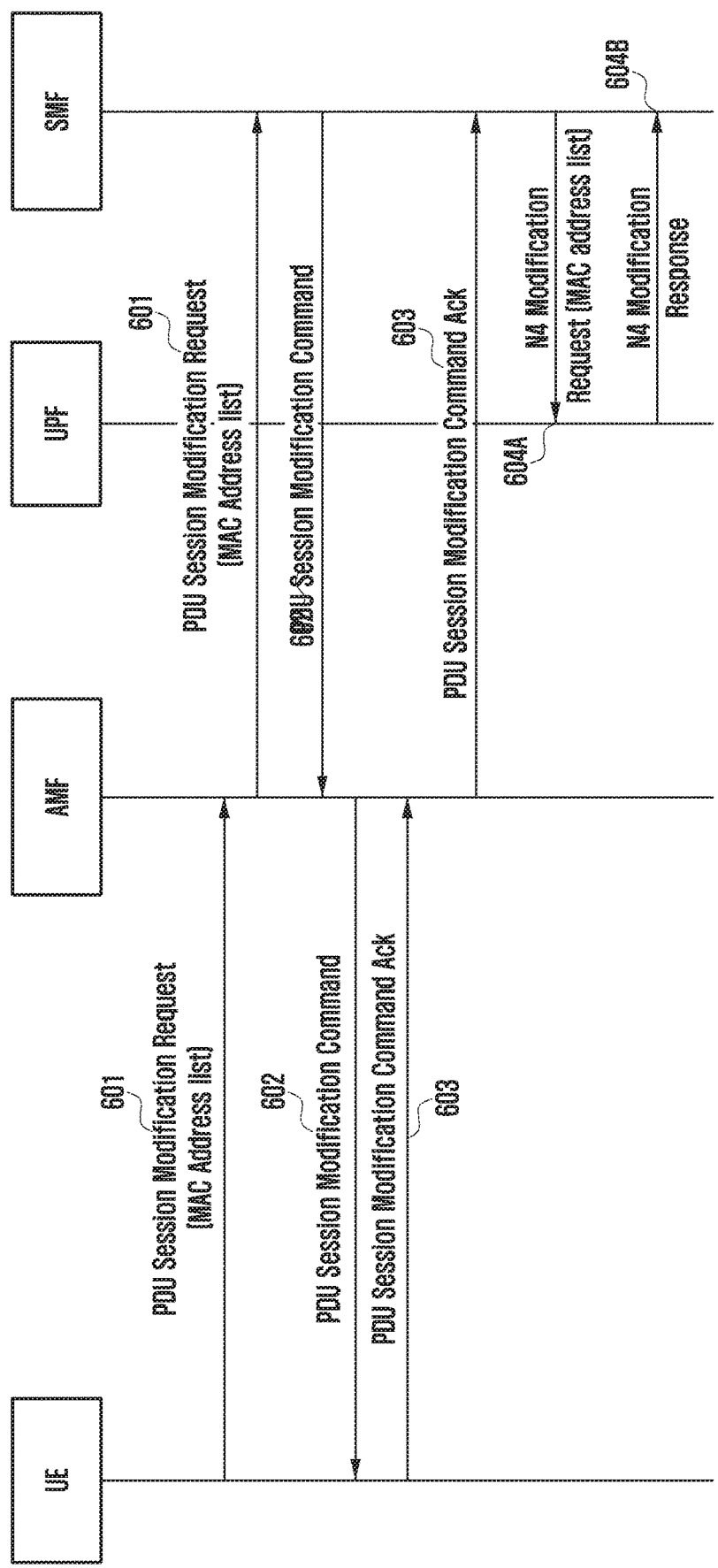
FIG. 6 illustrates a procedure of collecting and providing notification of media access control (MAC) addresses by a terminal according to an embodiment of the disclosure.

The procedure of the second embodiment may be performed through a PDU session change procedure, such as the procedure shown in FIG. 6. The SMF that has received the MAC addresses collected by the terminal may transmit the addresses to the UPF, and the UPF may use the MAC addresses to route the downlink packet.

FIG. 6 illustrates a procedure of collecting and providing notification of MAC addresses by a terminal according to an embodiment of the disclosure.

Referring to FIG. 6, in operation 601, a UE may transmit a PDU session modification request to the SMF through an AMF. The request may include information on a list of MAC addresses. Based on the above-described method, a terminal may collect MAC addresses of another device (another terminal or another Ethernet device) connected to a subnetwork of a terminal switch and transfer the collected MAC addresses to a network. In operation 602, the SMF may transmit a PDU session command to the AMF and the AMF may transmit the PDU session command to the UE. In operation 603, the terminal may transmit a PDU session modification command ACK to the AMF, and the AMF may transfer the PDU session modification command ACK to the SMF. In operation 604A, the SMF may transmit an N4 modification request to the UPF, and the message may include MAC address list information. The UPF may configure the routing for a downlink packet based on the MAC address list. The routing configuration may correspond to a change in the forwarding table. Then, the UPF may transfer data according to the changed forwarding table. In operation 604B, the UPF may transmit an N4 modification response to the SMF and use the MAC address to route the downlink packet. The N4 modification response may include the routing configuration for the downlink packet.

Third Embodiment

Figure 7:
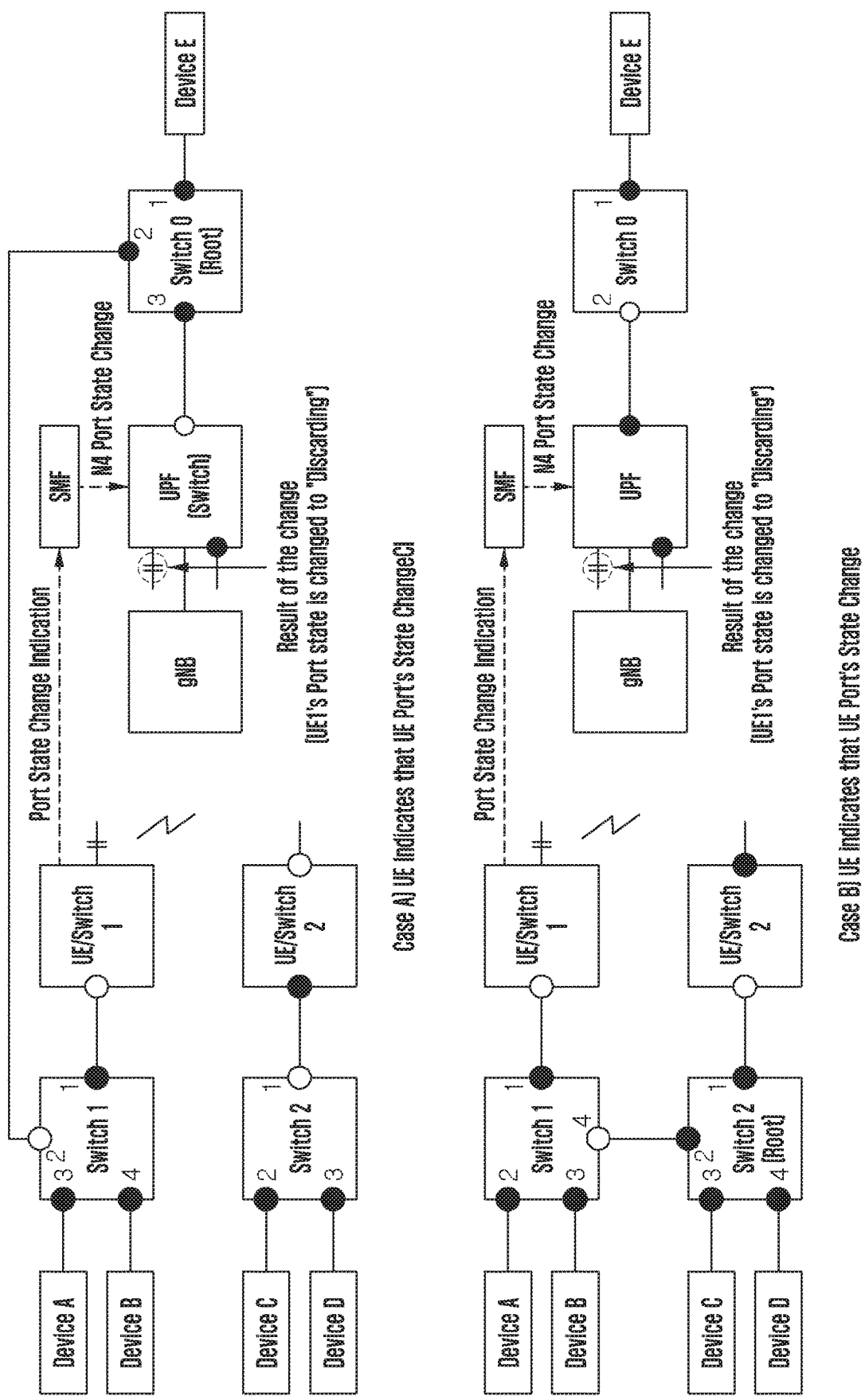
FIG. 7 illustrates a procedure of providing notification of an uplink port information by a terminal according to an embodiment of the disclosure.

FIG. 7 illustrates a procedure of providing notification of uplink port information by a terminal according to an embodiment of the disclosure.

Referring to FIG. 7, after performing a spanning tree algorithm in a network structure in which both a UE and a UPF are configured in a switch mode, as shown in case (A) in FIG. 7, if an uplink port (a port in a core direction, for example, a port in a UPF direction) of the UE is in a "discarding" state, a terminal may transmit, to a network, an indicator indicating that the terminal state has been changed, in order to reduce the inflow of additional broadcasts. For example, in the case in which state information is changed after the RSTP is performed in operation 511 of FIG. 5, if an indicator providing notification of whether or not the change occurs to the network is configured, the terminal may perform the operations illustrated in FIG. 7.

A method for transmission to a network is performed such that the indicator is transmitted to the SMF through a non-access stratum (NAS) message, and the SMF that has received the indicator may change state information for a corresponding terminal of N4 of the UPF through a N4 I/F.

In a method similar thereto, the terminal may transmit a message for port state change to the UPF/switch in an in-band form.

According to the method as described above, in the case in which the state of a network direction port of a terminal switch is changed, a network may be notified of the change. In addition, the network may perform routing according to the state of the network direction port, which has been received from the terminal.

Figure 8:
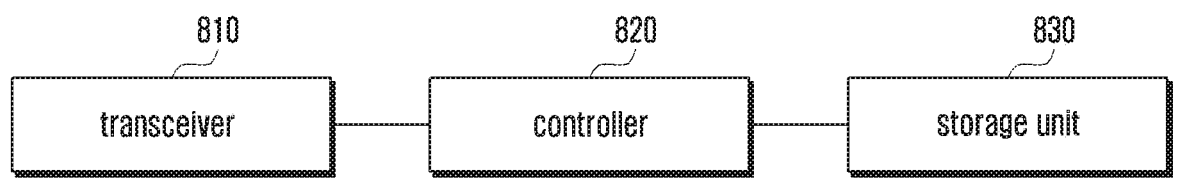
FIG. 8 illustrates a configuration of a terminal according to an embodiment of the disclosure.

FIG. 8 illustrates the configuration of a terminal according to an embodiment of the disclosure.

Referring to FIG. 8, a terminal may include a transceiver 810, a controller 820, and a storage unit 830. In the disclosure, the controller may be defined as a circuit or application-specific integrated circuit, or at least one processor.

The transceiver 810 may transmit or receive a signal to or from another network entity.

The controller 820 may control the overall operation of a terminal according to an embodiment proposed by the disclosure.

For example, the controller 820 is connected to the transceiver, and may perform control to: transmit a PDU setup request message including information indicating support of a switch mode, receive switch mode configuration information associated with the switch mode, and perform a switch mode operation based on the switch mode configuration information. The switch mode configuration information may include information indicating whether to execute a spanning tree algorithm. Further, the switch mode configuration information may further include information on a BPDU packet transmission period and information on Hello packet timeout. Transmission of a BPDU Hello packet may be determined based on the information on the BPDU packet transmission period, and whether to disconnect a link may be determined based on the information on the Hello packet timeout.

In addition, the controller 820 may perform control to obtain a MAC address of an Ethernet device connected to the terminal and transmit the MAC address of the Ethernet device to a network. The MAC address of the Ethernet device may be used to change the routing configuration of a UPF. The MAC address of the Ethernet device may be obtained through an operation of receiving a response to a paging message that has been transmitted by the terminal or through header information of an Ethernet frame via a switch of the terminal.

In addition, the switch mode configuration information may include an indicator indicating reporting of a state change when a switch port of the terminal is changed, and the terminal may transmit a state change indicator when the switch port is changed.

Figure 9:
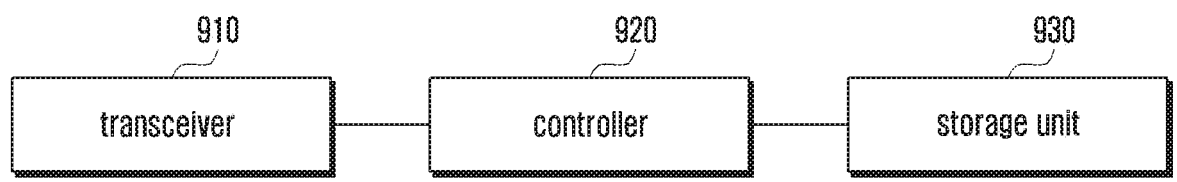
FIG. 9 illustrates a configuration of a network node according to an embodiment of the disclosure.

FIG. 9 illustrates the configuration of a network node according to an embodiment of the disclosure.

The network node may correspond to at least one of a UPF, an SMF, and an AMF according to an embodiment of the disclosure.

Referring to FIG. 9, the network node may include a transceiver 910, a controller 920, and a storage unit 930. The controller may be a circuit, an application-specific integrated circuit, or at least one processor.

The transceiver 910 may transmit or receive a signal to or from another network entity.

The controller 920 may control the overall operation of a network node according to an embodiment proposed by the disclosure.

For example, when the network node is the SMF, the controller 920 is connected to the transceiver, and may perform control to: receive information indicating a terminal to support a switch mode; generate switch mode configuration information which is associated with the switch mode and includes information indicating whether to execute a spanning tree algorithm; and transmit the switch mode configuration information associated with the switch mode. A switch mode operation of the terminal may be performed based on the switch mode configuration information.

The switch mode configuration information may include information on a BPDU packet transmission period and information on Hello packet timeout, wherein whether to transmit a BPDU Hello packet may be determined based on the information on the BPDU packet transmission period, and whether to disconnect a link may be determined based on the information on the Hello packet timeout.

In addition, the controller 920 may perform control to receive list information including a MAC address of an Ethernet device connected to the terminal. The list information may be used to change the routing configuration of a UPF.

In addition, the switch mode configuration information may include an indicator indicating reporting of a state change when the switch port of the terminal is changed, and the controller 920 may perform control to receive a state change indicator from the terminal when the switch port of the terminal is changed.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for a terminal, the method comprising:
transmitting a protocol data unit (PDU) setup request message including information indicating that the terminal supports a switch mode;
receiving switch mode configuration information associated with the switch mode; and
performing a switch mode operation based on the switch mode configuration information,
wherein the switch mode configuration information includes information indicating whether to execute a spanning tree algorithm.

2. The method of claim 1,
wherein the switch mode configuration information includes information on a bridge PDU (BPDU) packet transmission period and information on a Hello packet timeout period,
wherein transmission of a BPDU Hello packet is determined based on the information on the BPDU packet transmission period, and
wherein whether to disconnect a link is determined based on the information on the Hello packet timeout period.

3. The method of claim 1, further comprising:
acquiring a medium access control (MAC) address of an Ethernet device connected to the terminal; and
transmitting the MAC address to a network,
wherein the MAC address is used to change a routing configuration of a user plane function (UPF).

4. The method of claim 3, further comprising receiving a response to a paging message transmitted by the terminal or header information of an Ethernet frame via a switch of the terminal; and
obtaining the MAC address based on the response or the header information.

5. The method of claim 1,
wherein the switch mode configuration information includes an indicator indicating reporting of a state change in case that a switch port of the terminal changes, and
further comprising, in case that the switch port of the terminal changes, transmitting a state change indicator.

6. A terminal comprising:
a transceiver; and
a processor coupled with the transceiver and configured to:
transmit a protocol data unit (PDU) setup request message including information indicating that the terminal supports a switch mode,
receive switch mode configuration information associated with the switch mode, and
perform a switch mode operation based on the switch mode configuration information,
wherein the switch mode configuration information includes information indicating whether to execute a spanning tree algorithm.

7. The terminal of claim 6,
wherein the switch mode configuration information includes information on a bridge PDU (BPDU) packet transmission period and information on a Hello packet timeout period,
wherein transmission of a BPDU Hello packet is determined based on the information on the BPDU packet transmission period, and
determining wherein whether to disconnect a link is determined based on the information on the Hello packet timeout period.

8. The terminal of claim 6,
wherein the processor is further configured to:
acquire a medium access control (MAC) address of an Ethernet device connected to the terminal, and
transmit the MAC address to a network,
wherein the MAC address is used to change a routing configuration of a user plane function (UPF).

9. The terminal of claim 8, wherein the processor is further configured to:
receive a response to a paging message transmitted by the terminal or header information of an Ethernet frame via a switch of the terminal, and
obtain the MAC address based on the response or the header information.

10. The terminal of claim 6,
wherein the switch mode configuration information includes an indicator indicating reporting of a state change in case that a switch port of the terminal changes, and
wherein the processor is further configured to, in case that the switch port of the terminal changes, transmit a state change indicator.

11. A method for a session management function (SMF), the method comprising:
receiving information indicating that a terminal supports a switch mode;
generating switch mode configuration information associated with the switch mode, the switch mode configuration information including information indicating whether to execute a spanning tree algorithm; and
transmitting the switch mode configuration information associated with the switch mode,
wherein a switch mode operation of the terminal is performed based on the switch mode configuration information.

12. The method of claim 11,
wherein the switch mode configuration information includes information on a bridge protocol data unit (BPDU) packet transmission period and information on a Hello packet timeout period,
wherein whether to transmit a BPDU Hello packet is determined based on the information on the BPDU packet transmission period, and
wherein whether to disconnect a link is determined based on the information on the Hello packet timeout period.

13. The method of claim 11, further comprising receiving list information including a medium access control (MAC) address of an Ethernet device connected to the terminal,
wherein the list information is used to change a routing configuration of a user plane function (UPF).

14. The method of claim 13, wherein the MAC address of the Ethernet device is obtained based on a response to a paging message transmitted by the terminal or header information of an Ethernet frame via a switch of the terminal.

15. The method of claim 11, wherein the switch mode configuration information includes an indicator indicating reporting of a state change in case that a switch port of the terminal changes, and
further comprising, in case that the switch port of the terminal changes, receiving a state change indicator from the terminal.

16. A session management function (SMF) comprising:
a transceiver; and
a processor coupled with the transceiver and configured to:
  receive information indicating that a terminal supports a switch mode,
  generate switch mode configuration information associated with the switch mode, the switch mode configuration information including information indicating whether to execute a spanning tree algorithm, and
  transmit the switch mode configuration information associated with the switch mode,
wherein a switch mode operation of the terminal is performed based on the switch mode configuration information.

17. The SMF of claim 16,
wherein the switch mode configuration information includes information on a bridge protocol data unit (BPDU) packet transmission period and information on a Hello packet timeout period,
wherein whether to transmit a BPDU Hello packet is determined based on the information on the BPDU packet transmission period, and
wherein whether to disconnect a link is determined based on the information on the Hello packet timeout period.

18. The SMF of claim 16,
wherein the processor is further configured to receive list information including a medium access control (MAC) address of an Ethernet device connected to the terminal, and
wherein the list information is used to change a routing configuration of a user plane function (UPF).

19. The SMF of claim 18, wherein the MAC address of the Ethernet device is obtained based on a response to a paging message transmitted by the terminal or header information of an Ethernet frame via a switch of the terminal.

20. The SMF of claim 16,
wherein the switch mode configuration information includes an indicator indicating reporting of a state change in case that a switch port of the terminal has changed, and
wherein, in case that the switch port of the terminal changes, the processor is further configured to receive a state change indicator from the terminal.

\* \* \* \* \*